US009824298B1

(12) United States Patent
Krishnan Gorumkonda

(10) Patent No.: US 9,824,298 B1
(45) Date of Patent: Nov. 21, 2017

(54) PREDICTION AND DETECTION OF PRODUCE QUALITY

(71) Applicant: Amazon Technologies, Inc., Seattle, WA (US)

(72) Inventor: Gurunandan Krishnan Gorumkonda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 472 days.

(21) Appl. No.: 14/571,037

(22) Filed: Dec. 15, 2014

(51) Int. Cl.
*G06K 9/00* (2006.01)
*G06K 9/62* (2006.01)
*G06Q 30/06* (2012.01)
*G06Q 30/02* (2012.01)
*G08B 21/00* (2006.01)

(52) U.S. Cl.
CPC ....... *G06K 9/6215* (2013.01); *G06Q 30/0282* (2013.01); *G06Q 30/0601* (2013.01)

(58) Field of Classification Search
USPC ....... 382/100, 103, 108, 140–141, 155, 162, 382/168, 173, 181, 189–190, 199, 209, 382/219–220, 224, 232, 254, 274, 276, 382/286, 291, 294, 305, 312, 110; 250/326; 348/234; 340/540; 356/300
See application file for complete search history.

(56) References Cited

U.S. PATENT DOCUMENTS

| | | | | |
|---|---|---|---|---|
| 2002/0011567 A1* | 1/2002 | Ozanich | ................ | G01J 3/02 250/326 |
| 2004/0130714 A1* | 7/2004 | Gellerman | ............ | G01J 3/44 356/300 |
| 2013/0135101 A1* | 5/2013 | Kotula | ............... | G08B 3/10 340/540 |
| 2014/0147015 A1* | 5/2014 | Bajema | ............ | G06T 7/0004 382/110 |

(Continued)

OTHER PUBLICATIONS

Balogun et al., "Mini Review: Artificial Neural Network Application on Fruit and Vegetables Quality Assessment," International Journal of Scientific & Engineering Research, vol. 5, Issue 6 (Jun. 2014), pp. 702-708.

(Continued)

*Primary Examiner* — Seyed Azarian
(74) *Attorney, Agent, or Firm* — Kilpatrick Townsend & Stockton LLP

(57) ABSTRACT

Techniques for predicting and detecting produce quality may be provided. For example, visual or infrared characteristics of a produce item (e.g., skin, shape, wrinkles, and other characteristics of an apple, pepper, etc.) may be compared with ripeness characteristics of the type of produce item (e.g., other apples or peppers). The ripeness characteristics may correspond with the type of produce item at different stages of ripeness along a ripeness regression (e.g., a timeline of the produce item from raw to rotten). One or more ripeness scores of the produce item may be determined along a timeline (e.g., raw at day 1, rotten at day 10, etc.), (Continued)

so that when a user requests a produce item corresponding with a particular ripeness score, the produce item can be provided to the user based in part on the visual or infrared characteristics of the produce item and ripeness regression.

16 Claims, 10 Drawing Sheets

(56) References Cited

U.S. PATENT DOCUMENTS

2014/0293091 A1* 10/2014 Rhoads .................. G01J 3/513
348/234

OTHER PUBLICATIONS

Ohali, Yousef Al, "Computer Vision Based Date Fruit Grading System: Design and Implementation," *Journal of King Saud University—Computer and Information Sciences*, vol. 23 (2011), pp. 29-36.

Nayar et al., "Fast Separation of Direct and Global Components of a Scene using High Frequency Illumination," *ACM Trans. on Graphics* (also Proc. of ACM SIGGRAPH), Jul. 2006, 10 pages.

* cited by examiner

PREDICTION AND DETECTION OF PRODUCE QUALITY

BACKGROUND

Consumers purchase produce by visiting a grocery store, finding the produce that looks or feels appropriate, and paying for the produce at a cashier. When moving to an online environment, the interaction between the produce and the consumer is limited. For example, the consumer may ask for an apple from an online merchant, intending to eat the apple for lunch. By the time the online merchant sends the apple to the consumer, the apple might be far too ripe for eating. The apple would be wasted, incapable of being used for its intended purpose. In addition, the experience may discourage the consumer from purchasing online produce in the future.

BRIEF DESCRIPTION OF THE DRAWINGS

Various embodiments in accordance with the present disclosure will be described with reference to the drawings, in which.

DETAILED DESCRIPTION

Figure 1:
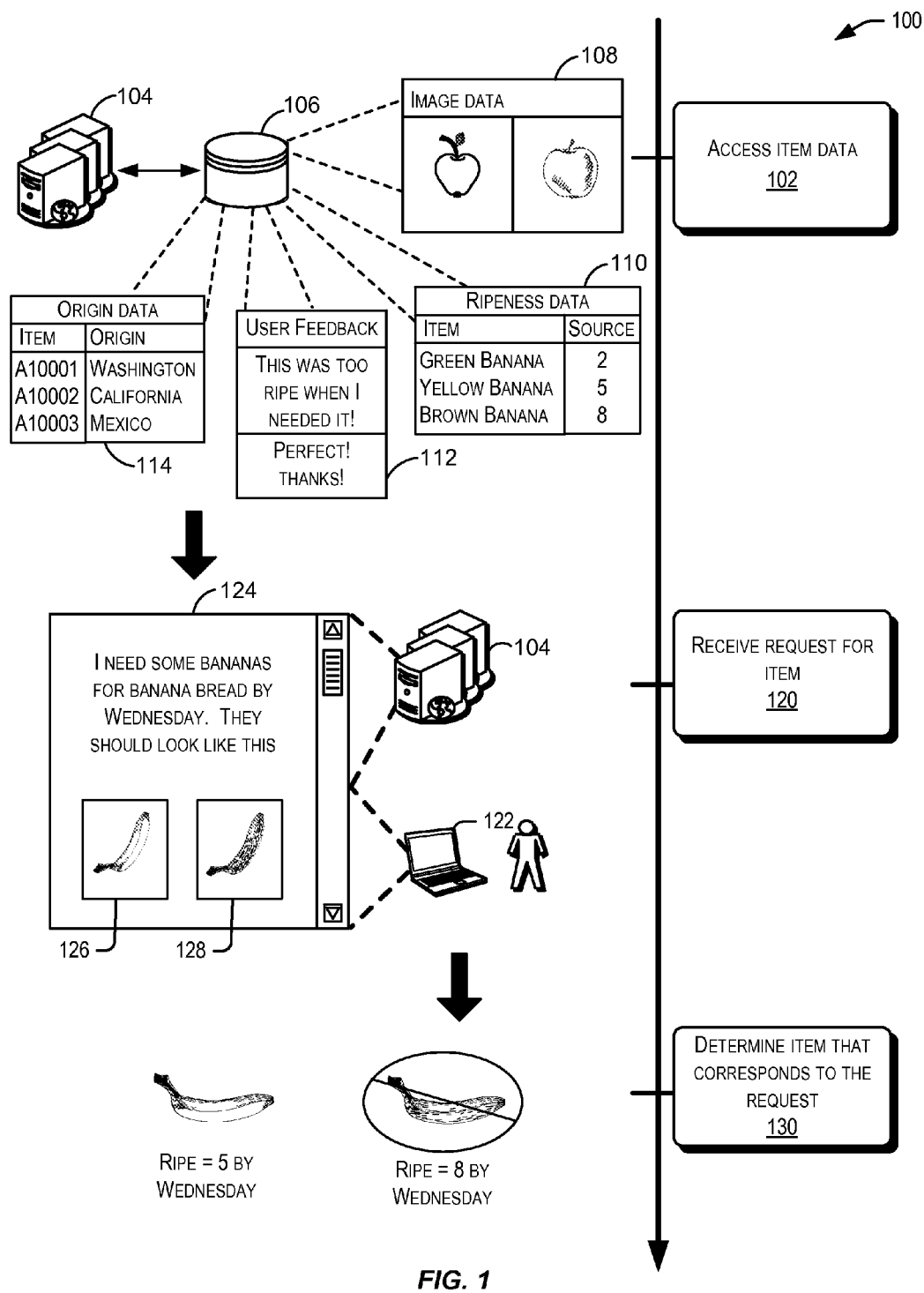
FIG. 1 illustrates an illustrative flow for predicting and detecting produce quality described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for predicting and detecting produce quality (e.g., a ripeness score of a produce item, whether mold is present, etc.). For example, data representing visual or infrared characteristics of a produce item (e.g., skin, shape, wrinkles, and other characteristics of an apple, pepper, etc.) may be compared with ripeness characteristics of the type of produce item (e.g., other apples or peppers). The ripeness characteristics may correspond with the type of produce item at different stages of ripeness along a ripeness regression (e.g., a timeline of the produce item from raw to rotten). One or more ripeness scores of the produce item may be determined along a timeline (e.g., raw at day 1, ripe at day 5, rotten at day 10, etc.), so that when a user requests a produce item corresponding with a particular ripeness score (e.g., to be ripe on a particular date), the produce item can be provided to the user based in part on the data representing visual or infrared characteristics of the produce item and ripeness regression.

In an illustrative example, a crate of apples is received at a fulfillment center or produce item processing computer. The system checks the apples for firmness (e.g., wrinkles, texture, etc.) utilizing one or more sensors (e.g., imaging devices, cameras, etc.), and data generated by the sensors (e.g., captured images from imaging device(s) or camera(s) including infrared (IR) images, digital (red/green/blue or RGB) images, subsurface scattering, etc.) to identify other characteristics of the apples. The system compares the data utilized to identify visual and/or infrared characteristics with other apples that were analyzed earlier in order to determine the relative ripeness of each apple of the crate of apples. Apples from the crate and other crates are then offered to users to order through a network page. When the user requests apples at the ripeness level that matches the ripeness level of at least some of the apples from the crate of apples, apples from the crate can be shipped to the user. If the user wants less ripe apples, apples from another crate with corresponding less ripe apples may be shipped to the user or the user may be informed that the apples at the particular ripeness are unavailable (e.g., via a communication from the system). If the user wants more ripe apples, the shipment may be delayed or different apples may be found (e.g., that correspond with the user's desired ripeness, the apples may be shipped with instructions that inform the user how to ripen the apples to a desired level by a particular time, etc.).

FIG. 1 illustrates an illustrative flow for predicting and detecting produce quality described herein, according to at least one example. The process 100 can begin with accessing item data at 102. For example, a computing device 104 can interact with a data store 106 to access stored data representing visual or infrared characteristics of an item, item data, and/or interact with one or more items to determine the item data. For example, the item data may include image data 108 (e.g., image data/photographs of the produce item, other images from one or more angles, etc.), ripeness data 110 (e.g., "raw" corresponds with a ripeness score of 0-2, "ripe" corresponds with a ripeness score of 3-7, "rotten" corresponds with a ripeness score of 8-10, etc., such that a green banana is 2, a yellow banana is 5 and a brown banana is 8), feedback 112 (e.g., communication(s) from the user identifying the received ripeness when the produce item arrived at a location associated with the user, including "This was too ripe when I needed it!" or "Perfect! Thanks!"), and origin or source data 114 (e.g., the source that provided the produce item, including a state, city, farm, climate associated with a location, soil composition used to grow the produce item, or other environmental factors that may affect the ripeness regression of the produce item). Other data may be accessed about a produce item without diverting from the scope of the disclosure.

In some examples, a training data set may be generated that can help predict a ripeness regression for a future produce item of a same or similar produce type or variety. For example, the computing device 104 may receive the initial produce item and gather item data about it (e.g., one or more images of the produce item, firmness/sensor measurements, etc.). In some examples, an expert computing device or expert user may review the item data for the initial produce item to identify the relative ripeness of the initial produce item with the particular characteristics identified in the item data. The initial produce item can correspond with one or more produce types (e.g., Fuji apples produce type, organic apples produce type, Acme Farms produce type, Fuji and organic apples from Acme Farms produce type, generic apple produce type, etc.). The ripeness score for the initial produce item may be extrapolated to correspond with the one or more produce types. A plurality of produce items may be analyzed and associated with ripeness scores by the expert computing device or expert user in order to generate average characteristics for the produce types associated with the plurality of produce items (e.g., of the 10 Fuji apples, 75% of them are 255/10/10 color, 50% density, 0.25 pounds in weight, and are perfectly ripe by day 5, so the produce type "Fuji apples" are likely to have these characteristics as well).

The training data set may be used to help determine a regression ripeness for the produce type based in part on the shared characteristics in the training data set. For example, wrinkles in the Fuji apple training data set correspond with ripeness score 8 (e.g., based on ten Fuji apples observed, measured, and analyzed by the expert computing device or expert user), so future produce items that are similar to the Fuji apples training data set also correspond with a ripeness score of 8 when they have similar wrinkles.

In some examples, the training data set may include produce items associated with other produce types as well. For example, the computing device 104 can interact with the data store to access data representing visual or infrared characteristics for similar produce types. In an example illustration, produce types may include apples from the same farm in California, different types or varieties of apples from a farm in California (Fuji, Granny Smith, and Braeburn, organic/non-organic), organic Fuji apples from two farms in Washington with similar training data set characteristics, apples that were grown under the same conditions as the current apples, etc. This may help determine a ripeness score of a new produce item based in part on observed ripeness regressions of produce items that ripen in a similar manner. The observed ripeness regressions may be observed and/or analyzed in association with previously-identified training data sets (e.g., including image data 108, ripeness data 110, feedback 112, origin or source data 114, etc.). In some examples, the ripeness score for the desired produce item is indicated by at least one of an image of the produce item, a purpose of the produce item, a desired date of use for the produce item, or one or more environmental factors associated with a location of a user.

The process 100 may also receive a request for an item at 120. For example, the computing device 104 may provide a network page 124 for a user 122. The network page 124 may provide a graphical user interface (GUI) that includes one or more images of produce items at various ripeness levels, including a first image 126 of a produce item at a first ripeness score and a second image 128 of the produce item at a second ripeness score displayed by the network page.

The user 122 may submit a request for a produce item associated with a particular ripeness, which is received by computing device 104. As illustrated, the network page 124 may also provide information (e.g., visual characteristics, infrared characteristics, images, item data, etc.). As illustrated, the network page 124 can provide the first image 126 and second image 128 of produce items associated with different ripeness scores, and allow the user 122 to choose which one they prefer (e.g., by clicking, activating, selecting, etc.).

The process 100 may also determine an item that corresponds with the request at 130. For example, the computing device 104 may receive a selection or identification of a desired ripeness score in a communication from the user (e.g., via the network page 124, via messaging system external to the network page, etc.). As illustrated, the user may choose the first image 126 associated with the first ripeness score. The computing device 104 may determine a corresponding produce item at a facility (e.g., fulfillment facility, merchant facility, third party facility, virtual management facility, etc.) associated with the first ripeness score (e.g., based in part on the training data set, an extrapolated ripeness score of one or more produce items in the facility, and/or an identification of a produce item that should achieve the ripeness score by the specified date). The item identified by the computing device 104 may correspond with the same produce type as the produce item identified by the user (e.g., similar produce types, similar varieties, etc.). The computing device 104 may also determine that the corresponding produce item may achieve the first ripeness score approximately on the specified date based in part on a ripeness regression of the produce item.

The computing device 104 may instruct that the produce item that corresponds to the ripeness score identified by the user be provided to the user (e.g., shipped, ordered, placed in an electronic shopping cart, fulfilled, etc.). For example, the computing device 104 can instruct the facility to provide the corresponding item to the user based in part on the ripeness regression and the specified date.

Figure 2:
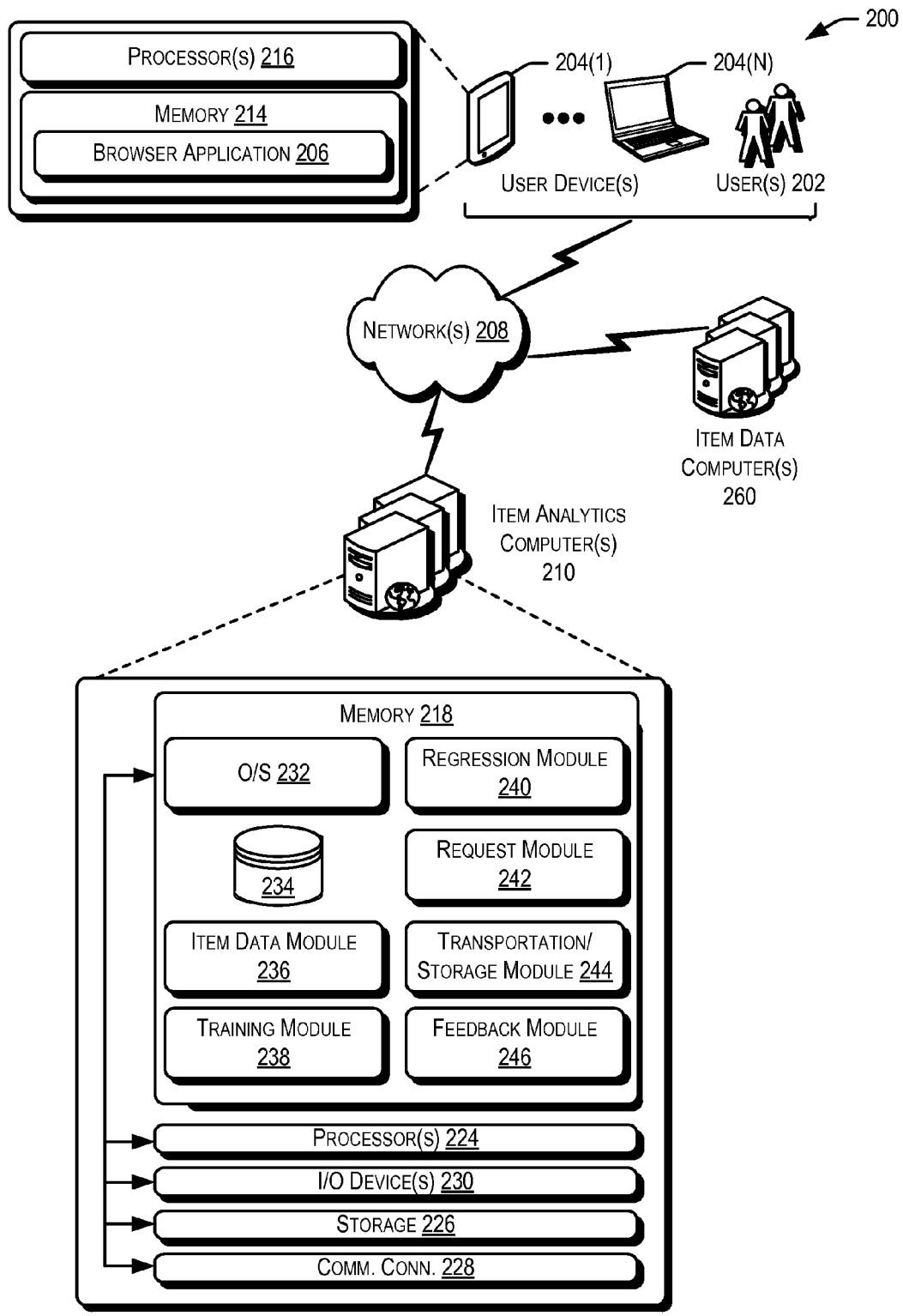
FIG. 2 illustrates an example architecture for predicting and detecting produce quality described herein that includes an item analytics computer, item data computer, and/or a user device connected via one or more networks, according to at least one example.

FIG. 2 illustrates an example architecture for predicting and detecting produce quality described herein that includes an item analytics computer, item data computer, and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers, one or more item analytics computers 210, and/or one or more item data computers 260.

The one or more item analytics computers 210 may, in some examples, provide computing resources such as, but not limited to, client entities, low latency data storage, durable data storage, data access, management, virtualization, cloud-based software solutions, electronic content performance management, etc. The one or more item analytics computers 210 may also be operable to provide web hosting, computer application development, and/or implementation platforms, combinations of the foregoing, or the like to the one or more users 202. The one or more item analytics computers 210, in some examples, may help predict or detect produce quality for a produce item.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the item analytics computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more item analytics computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user devices 204 may be in communication with the item analytics computers 210 via the networks 208, or via other network connections. Additionally, the user devices 204 may be part of the distributed system managed by, controlled by, or otherwise part of the item analytics computers 210 (e.g., a console device integrated with the item analytics computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the item analytics computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the item analytics computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the item analytics computers 210 may be in communication with the user devices 204 and/or other service providers via the networks 208, or via other network connections. The item analytics computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the item analytics computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of item analytics computers 210, the memory 218 may be volatile (such as RAM) and/or non-volatile (such as ROM, flash memory, etc.). The item analytics computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the item analytics computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the item analytics computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The item analytics computers 210 may also contain communications connection(s) 228 that allow the item analytics computers 210 to communicate with a stored database, another computing device or server, user terminals and/or other devices on the networks 208. The item analytics computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an item data module 236, training module 238, regression module 240, request module 242, transportation/storage module 244, and/or feedback module 246. The modules may be software modules, hardware modules, or a combination thereof. If the modules are software modules, the modules will be embodied on a computer readable medium and processed by a processor in any of computer systems described herein.

The memory 218 may include an item data module 236. The item data module 236 may be configured to determine quantitative and/or qualitative features of a produce item using one or more imaging devices, cameras, projectors, sensors, or other hardware or software used to identify item data. The item data module may also receive item data from the item data computer 260, including data representing visual or infrared characteristics discussed throughout the disclosure (e.g., firmness, wrinkles, subsurface scattering, etc.). In some examples, the item data is determined based in part on the type of produce item. In some examples, the identification of the produce item may identify which item data to determine (e.g., via the item data computer 260) and/or which item data to skip or not determine (e.g., determine characteristics from the IR camera, but not the RGB/digital camera for apples, etc.).

The memory 218 may include a training module 238. The training module 238 may be configured to analyze the item data for an initial produce item and/or generate a training data set for a produce type. For example, the training module 238 may receive the initial produce item and determine item data, which may be used to generate a training data set (e.g., one or more images of the produce item, firmness/sensor measurements, etc.). The item data for that produce item may be analyzed and training data may be produced. The training module may also be configured to interact with the regression module 240 to help determine a regression ripeness for the produce type, produce item, and/or based in part on visual characteristics of the produce item and/or training data set (e.g., wrinkles correspond with ripeness score 8).

The memory 218 may include a regression module 240. The regression module 240 may be configured to associate ripeness characteristics of a produce type of the produce item with a ripeness score (e.g., by a particular date, based in part on environmental factors, or other item data). Based in part on the ripeness characteristics of the produce item, ripeness characteristics of other similar produce items, a time frame, one or more environmental factors, the estimated ripeness when the produce item arrives at a user's location, etc., similar items that are analyzed after the initial item (e.g., a second item) may be compared with initial item to help predict how ripe the second item will be in the future and at what date a desired ripeness can be achieved.

The memory 218 may include a request module 242. The request module 242 may be configured to receive a communication from a user that identifies a desired ripeness level (e.g., based on data representing visual or infrared characteristics of the produce item, based on a time frame to use the produce item, based on the purpose of the produce item, etc.). In some examples, the request module 242 may identify the request without a communication from a user (e.g., based on an identified pattern in a user's order history, based on browsing characteristics of the user, etc.).

The memory 218 may include a transportation/storage module 244. The transportation/storage module 244 may be configured to provide produce items to the user based in part on the request (e.g., via a communication, browsing characteristics, etc.), including instructing a facility or fulfillment center, computing device, or other system to provide the produce item(s) to the user (e.g., via shipping, ordering, electronic shopping cart, etc.). The transportation/storage module 244 may also be configured to analyze one or more environmental factors associated with the transportation of the produce item to the user and incorporate the information with the ripeness regression (e.g., how ripe the item will be when delivered to the user by a hot van versus a refrigerated truck or pouch).

The memory 218 may include a feedback module 246. The feedback module 246 may be configured to receive feedback. For example, the user may confirm the ripeness of the produce item when it is received with their desired ripeness score, or provide additional item data regarding the ripeness of the item at arrival. The feedback module 246 may also be configured to update item data (e.g., via the item data module 236 or training data module 238) to account for the additional information from the user and/or update the ripeness regression (e.g., via the regression module 240) to identify the ripeness of the produce item at a particular date.

The item data computer(s) 260 may be implemented similar to item analytics computers 210 or user devices 204, including at least one memory and one or more processing units or processors. The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The memory may be similar to memory 214 and the processor(s) may be similar to 216. In some examples, the contents of the memory may include an operating system, one or more data stores 234, and/or one or more application programs or services for implementing the features disclosed herein including a produce item data module to receive or access produce data.

Figure 3:
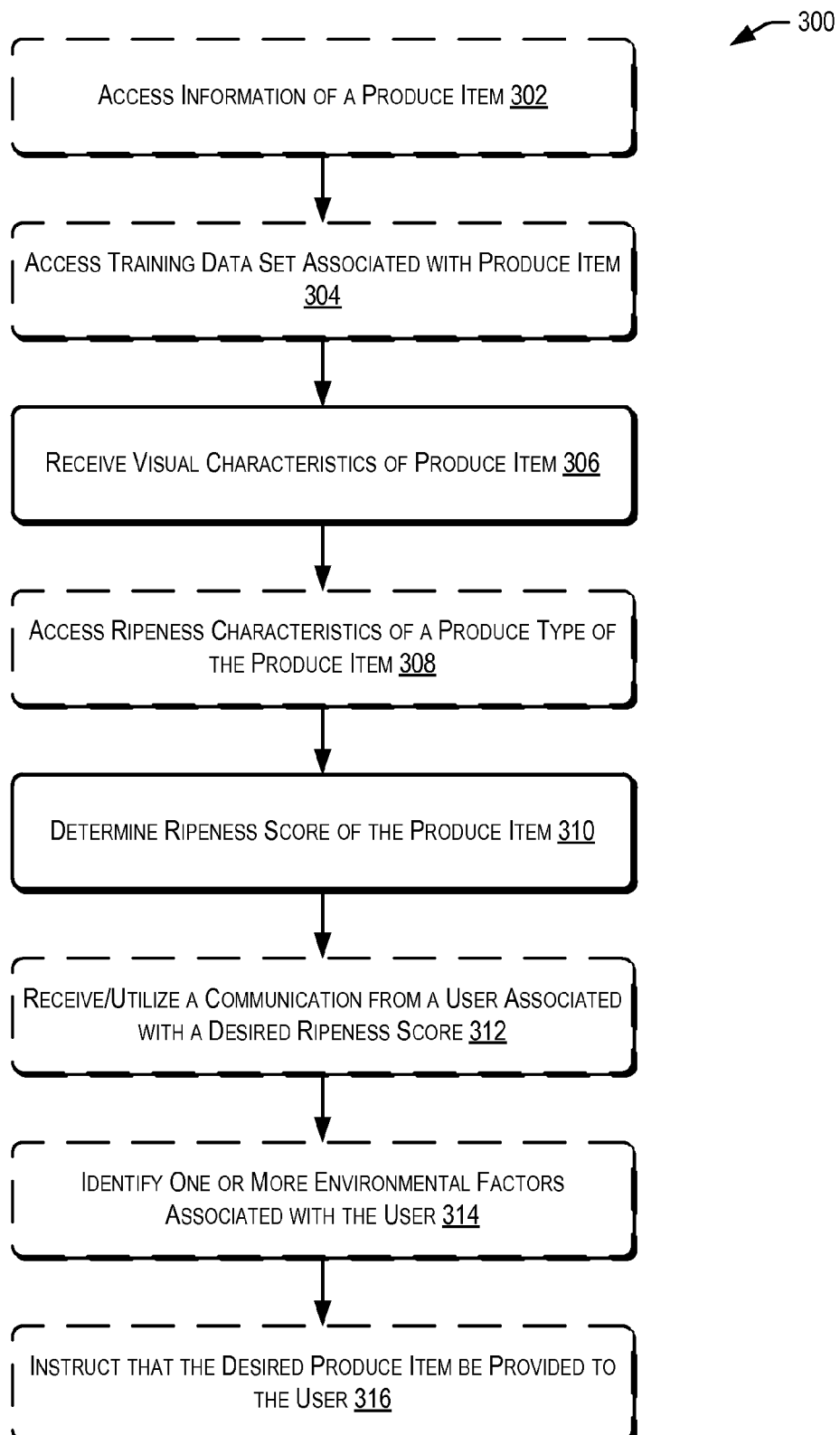
FIG. 3 illustrates an example flow diagram for predicting and detecting produce quality described herein, according to at least one example.

FIG. 3 illustrates an example flow diagram for predicting and detecting produce quality described herein, according to at least one example. In some examples, the one or more item analytics computers 210 (e.g., utilizing at least one of the item data module 236, training module 238, regression module 240, request module 242, transportation/storage module 244, and/or feedback module 246), item data computer 260, or one or more user devices 204 shown in FIG. 2 may perform the process 300 of FIG. 3. The process 300 may optionally begin at 302 by accessing information regarding a produce item, including an origin of the produce item. For example, the item analytics computers 210 may scan a barcode or other identifier associated with the produce item (e.g., at a crate that stores the produce item, a barcode on a sticker affixed to the produce item, etc.). The barcode or other identifier may allow the one or more item analytics computers 210 to access information about the produce item (e.g., is it an apple, pear, avocado, etc.) including information regarding the origin of the produce item. In some examples, the item analytics computers 210 may identify the origin of the produce item through item data, including shipping information (e.g., from a farm, etc.), visual characteristics (e.g., by comparing images of other produce items with the current produce item to find which produce type is most similar), metadata, or other sources of information.

At 304, a training data set associated with the origin may optionally be accessed. For example, the item analytics computers 210 may access a training data set associated with the origin of the produce item that identifies item data for the produce item (e.g., "once we know where the produce item is from and/or visual characteristics of the item, we can predict that the items with these visual characteristics have a ripeness score of 8," etc.).

A ripeness regression may also be identified from the training data set and/or ripeness characteristics of the produce item. The ripeness characteristics can represent a ripeness regression of the produce type over a time frame (e.g., "apples from Acme Farm that correspond with a firmness score of 7 at arrival, maintain a ripeness score of 5 for four days and are rotten at ten days, with a ripeness score of 10," etc.). The ripeness characteristics can also or alternatively represent a ripeness regression in response one or more environmental factors (e.g., "apples from California maintain a ripeness score for three days if they are placed in the refrigerator," etc.) or other item characteristics (e.g., "organic apples that correspond with RGB color 255-10-10 at arrival maintain a ripeness score of 3 for two days and are rotten with a ripeness score of 9 by six days," etc.).

At 306, data representing visual or infrared characteristics of a produce item may be received. For example, the item analytics computers 210 may receive visual characteristics associated with the produce item from one or more imaging devices or cameras, e.g., as the produce item moves on a conveyor belt. Examples of the conveyor belt and cameras are provided with FIG. 4. Visual characteristics may also be accessed at a data store or other source.

At 308, ripeness characteristics may optionally be accessed. For example, the item analytics computers 210 may access standard characteristics of a produce item that corresponds with a particular produce type. For example, most oranges from a farm in Florida correspond with a particular stem length, leaf shape, dimpling, and colors. The ripeness characteristics of those particular oranges may be imparted on the new produce item from the similar origin. In some examples, the ripeness characteristics can include a visual representation of ripeness regression associated with the particular produce type. The ripeness regression may correspond with at least one of a time frame (e.g., day 1 to day 5) or one or more environmental factors (e.g., heat, humidity, light, etc.).

At 310, a ripeness score of the produce item may be determined. For example, the item analytics computers 210 may determine a ripeness score of the produce item based at least in part on a comparison of the data representing visual characteristics and the training data set. In some examples, the ripeness score is determined by extrapolating the ripeness score from the previously-identified ripeness scores of produce that share the same produce type.

At 312, a communication may optionally be received and/or utilized from a user. For example, the item analytics computers 210 may receive a communication from a user for a desired produce item associated with a desired ripeness score. In another example, the communication may be received by a second computing device and utilized (e.g., accessed, analyzed, determined, etc.) by the item analytics computers 210. The user may select the desired ripeness score based in part on images of produce items associated with the ripeness score (e.g., a ripeness score of 8 looks like this and a ripeness score of 5 looks like this, etc.). In some examples, the ripeness score of the produce item is determined from a passive communication (e.g., shopping/order history, browsing history, interactions with network pages, etc.).

At 314, one or more environmental factors associated with the user may optionally be identified. The item analytics computers 210 may identify the one or more environmental factors associated with the user (e.g., by communicating with the user, by inferring environmental factors from the shipping location, etc.). For example, the user may be located in a relatively humid climate and/or keep their home at 60-degrees. In other examples, the environmental factors may be associated with the transportation and storage of the produce item, including transportation by various vehicles, in various types of packaging, over a particular time frame and/or storing the item in a refrigerator, in a freezer, on a shelf, in the sun, etc.

At 316, instructions associated with the desired produce item may be provided. For example, the item analytics computers 210 may instruct that the desired produce item be provided to the user upon determining that the ripeness score of the produce item matches the desired ripeness score requested by the user. In some examples, the item analytics computers 210 may instruct that a produce item having the desired ripeness score be provided to the user as the desired produce item.

Figure 4:
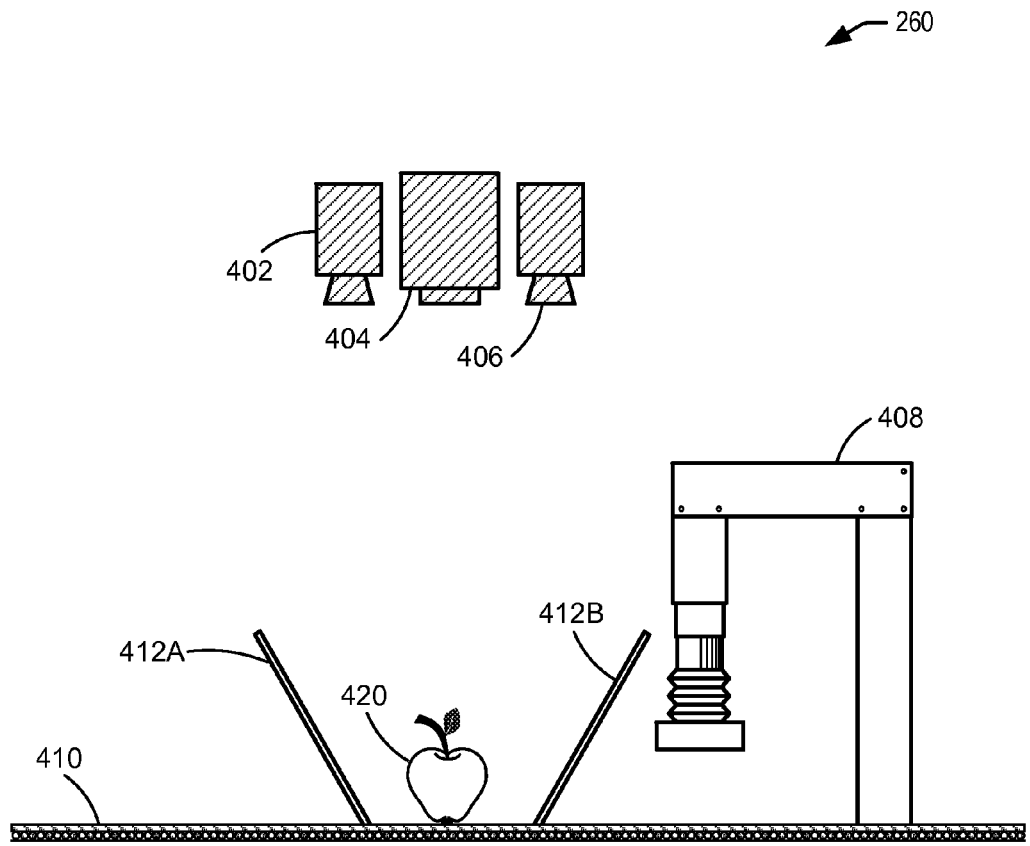
FIG. 4 illustrates an example item analytics computer and/or item data computer described herein, according to at least one example.

FIG. 4 illustrates an example item analytics computer and/or item data computer described herein. The item data computer 260 (as illustrated in FIG. 4) includes an infrared (IR) camera 402, projector 404, digital camera 406 (e.g., non-IR, images captured in red-green-blue (RGB), etc.), sensor 408, conveyor belt 410, and mirrors 412A and 412B (hereinafter "mirrors 412"). For example, the projector 404 may project a source of light toward the conveyor belt at a produce item 420. The IR camera 402 may capture infrared characteristics of the produce item 420 as the produce item 420 is close to the IR camera 402. In another example, the digital camera 406 may capture data representing visual characteristics of the produce item 420 as the produce item 420 is close to the digital camera 406. The item data computer 260 may analyze visual or infrared characteristics of the produce item 420 to determine item data. In some examples, the item data computer 260 may be implemented as part of the item analytics computers 210 without diverting from the scope of the disclosure.

The projector 404 may provide light to a directed portion of the conveyor belt 410 (e.g., toward the produce item 420). The produce item 420 may also be illuminated from other light sources (e.g., lights in a facility, light reflections from the conveyor belt 410 or mirrors 412, etc.). In some examples, the light source may include a diffusion of light of a translucent surface of the produce item (e.g., light that is emitted from an inner layer of the produce item 420).

In some examples, the light radiance may be based in part on the direct illumination of the produce item 420 by a light source (e.g., projector 404) and global illumination from other light sources in proximity to the produce item 420. The global illumination can arise from inter-reflections, subsurface scattering, volumetric scattering, and/or translucency. Information identified from direct and global illumination sources (e.g., visual characteristics) may be analyzed to determine item data associated with the produce item 420.

The visual or infrared characteristics of the produce item 420 may be captured from different angles. For example, the light source from the projector 404 may project light toward the mirrors 412, so the underside of the produce item is illuminated. The IR camera 402 and/or digital camera 406 may capture infrared images of the produce item, in part by capturing the reflection of the produce item via the mirrors.

The sensor 408 may determine physical characteristics of the produce item 420. For example, the sensor 408 may press the produce item to identify the thickness, firmness/softness, viscosity, bendability, density, or other tactile measurements of the produce item 420. In some examples, the sensor 408 may determine the texture of the produce item 420. In some examples, the sensor 408 may determine the characteristics of the produce item without touching the produce item.

Other components and analytics of systems known in the art may be incorporated with item data computer 260 without diverting from the scope of the disclosure. For example, the computer described in "Fast Separation of Direct and Global Components of a Scene using High Frequency Illumination," S. K. Nayar, G. Krishnan, M. D. Grossberg, R. Raskar, ACM Trans. on Graphics (also Proc. of ACM SIGGRAPH), July 2006 may be incorporated with item data computer 260. This publication is incorporated herein in its entirety for all purposes.

Figure 5:
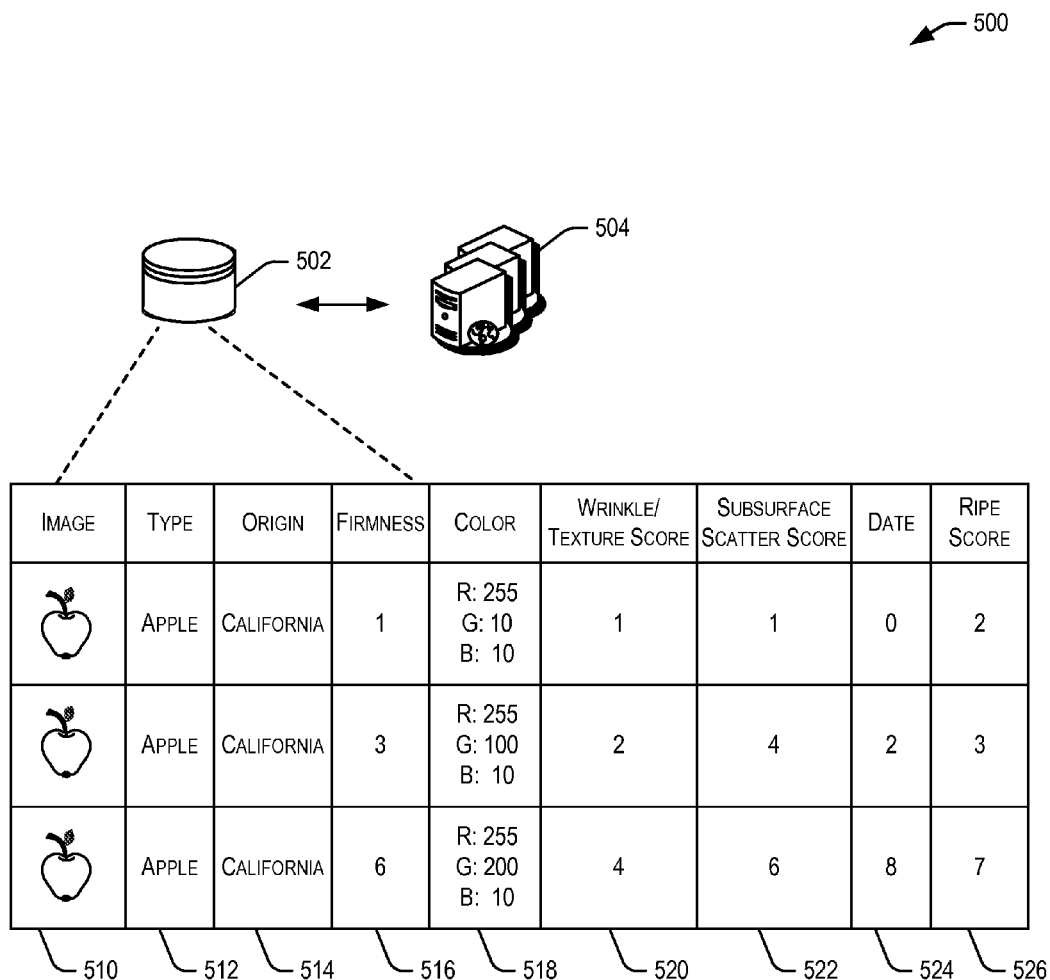
FIG. 5 illustrates some examples of item data and ripeness scores described herein, according to at least one example.

FIG. 5 illustrates some examples of item data and ripeness scores described herein, according to at least one example. For example, data store 502 may include item data associated with one or more items. In some examples, the data store 502 may include training data or item data associated with new items received by a facility, including image data 510, produce type data 512, origin data 514, firmness data 516, color data 518, wrinkle/texture score data 520, subsurface scatter score 522, date data 524, and ripeness score 526. An example of computer 504 may include the computer(s) identified in FIGS. 2 and 4.

The data store 502 may include training data and item data for new produce items that are received by the computer 504. For example, when a produce item is received by the computer (e.g., the first time that the computer 504 has analyzed a particular type of produce item including apples from Mexico or bananas from a farm in West Africa), the computer may capture the item data to identify this new type of produce item. The item data may be stored with data store 502 as training data. The training data may include measurements and/or analysis of the produce item over time. When a subsequent produce item is received that is similar to the initial produce item (e.g., the same type of produce item, the same source, a similar origin, etc.), the data from the previous produce item may be used to infer characteristics associated with the new produce item. For example, the new produce item may not need to be analyzed when it is received by the computer 504 and, instead, characteristics may be inferred (e.g., including the ripeness score on a particular date). In some examples, item data associated with the subsequent produce item is used to add to the training data (e.g., to include additional item data about the type of produce item, etc.).

In some examples, the type of produce item is measured and/or analyzed based in part on one or more environmental factors. For example, the training data can include item data associated with a low humidity environment and item data associated with a high humidity environment. Temperature, moisture, light, and other information that might affect the item data may also be included with the item data (e.g., one or more environmental factors, the temperature of a facility that receives the produce item, humidity of a location of a user that receives the produce item from a facility, etc.). As an illustration, the training data associated with an apple in low humidity, 80-degree heat, and stored in a dark room might indicate particular characteristics of the apple by day ten. The training data associated with an apple in high humidity, 80-degree heat, and stored in a bright room could indicate different characteristics of the apple by day ten, and each set of training data may be stored as separate rows in the data store 502.

The data may be received from third party computers as well. For example, a humidity or temperature in a location of a user may be transmitted to the computer 504 and/or stored in the data store 502 from a network-connected device associated with the user's location (e.g., electronic thermostat, home automation humidity control, refrigerator that measures an internal environment in the location of the user, etc.). In some examples, the data may be stored with a user's profile and/or profile associated with the location of the user. In some examples, the stored data may be collected from and/or determined by one or more sensors from the location of the user.

Image data 510 may be determined. For example, the computer 504 may capture one or more images of the produce item as the produce item passes by one or more cameras on a conveyor belt. The images may include various angles of the produce item (e.g., identified through mirrors 412 or movable cameras, etc.). As illustrated, the image data 510 may include a representative image of the produce item. In some examples, the image data 510 is received from the origin, images of the items in the crate (e.g., without a conveyor belt), or other means known in the art to capture or receive images.

The image data 510 may help identify visual or infrared characteristics of the produce item and/or produce type. For example, the data representing visual characteristics may be associated with operating one or more cameras to capture a plurality of images of the produce item. The plurality of images can include at least a first angle and a second angle of the produce item (e.g., front, top, sides, etc.). In some examples, the image data associated with an apple from a farm in Mexico may have different stripes or colors than an apple from a farm in California. The image data may help identify the origin of the produce item based in part on these visual characteristics identified in the image data. In another example, the image data may help identify a ripeness of an item.

Produce type data 512 may be determined. For example, the computer 504 may determine the produce type or variety of a produce item by various methods. The produce type may be identified from a shipping receipt, label attached to the produce item, barcode (e.g., on the produce item, on a shipping container or crate that holds multiple produce items of the same type, etc.), metadata associated with an identifier of the produce item, etc. In some examples, a user may identify the produce type by typing, selecting, or otherwise identifying the produce item for the computer 504. In some examples, the produce type associated with a produce item may be identified by comparing an image of a produce item with an image of another produce item associated with a particular produce type (e.g., in a training data set). For example, a banana (e.g., new produce item) might look more like an image of a banana that was previously identified (e.g., as part of the training data, etc.) than an image of a previously identified apple. As illustrated, the produce type data 512 includes the term "apple" that associates a particular produce item with a produce type.

In some examples, produce type data 512 may include a produce type or variety associated with a hierarchy. For example, the produce item may be identified as a "Braeburn organic apple produce type" (e.g., based in part on an expert computing device, scanning a barcode, comparison with an image in a training data set, etc.). The produce item may be associated with other similar produce types, including "Braeburn apple produce type," "organic apple produce type," or "apple produce type." One or more of these similar produce types may be related to the original "Braeburn organic apple produce type" (e.g., broader/more narrow in a hierarchy, etc.). In some examples, the ripeness regression and/or item data associated with these related produce types may be more extensive, detailed, etc. in order to get a better prediction of the ripeness regression for the similar produce type.

Origin data 514 may be determined. For example, the computer 504 may determine the origin of the item through various methods. The origin of the produce item may be identified from a shipping receipt, label attached to the produce item, barcode (e.g., on the produce item, on a shipping container or crate that holds multiple produce items of the same type, etc.), metadata associated with an identifier of the produce item, etc. In some examples, the origin of the produce item may be identified by comparing an image of a produce item with an image of another produce item associated with a particular origin. As illustrated, the origin data 514 includes the origin "California" that associates a particular produce item with an origin. In some examples, the origin data may include more or less detailed information as well. For example, a particular farm or provider of the produce item may be identified as the source of the item (e.g., address, "Acme Farms," etc.).

In some examples, produce type data 512 or origin data 514 may be identified by a process performed by the computing device illustrated in FIG. 4. For example, the origin information may be accessed that includes one or more visual or infrared characteristics associated with other produce items from different origins. The visual characteristics associated with the produce item may be compared with the visual characteristics associated with the other produce items. The origin of the produce item may be determined based in part on the comparison. For example, when the visual or infrared characteristics are similar (e.g., stripes, colors, size, weight, skin thickness, etc.), the new produce item may correspond with the other produce items. When the comparison is sufficiently distinct (e.g., within a threshold, etc.), other comparisons may be performed (e.g., to identify a more similar produce item).

Characteristics of the origin may be associated with the produce item as item data. For example, when a farm is associated with soil characteristics, weather, care, organic/non-organic status (e.g., wax on apples, pesticides used, faster rotting, and the like), etc., the same or similar characteristics may also be associated with the produce item. In some examples, the environmental factors associated with the origin of the produce item may be associated with particular produce item (e.g., high/low humidity, heat, light, etc.). In some examples, each of the distinct origins may be identified as unique produce types and/or associated with unique ripeness regressions.

Firmness data 516 may be determined. For example, the computer 504 may determine the firmness of the item on a scale (e.g., 0 is very hard and 10 is very soft, etc.). The firmness of the produce item may be determined by the sensor 408, user (e.g., expert user with knowledge of the range of firmness for produce items, expert computing device, etc.), or based in part on received data (e.g., from the origin, from a computer or data store, etc.). As illustrated, the firmness data may correspond with a firmness score (e.g., 1 is hard and 6 is softer).

In some examples, the firmness data 516 may be inferred through image data. For example, when a produce item is "very firm" or "2," the image of the item may correspond with the high firmness score (e.g., stiff, immovable, etc.). Similarly, when the produce item is "very soft" or "9," the image of the item may correspond with the low firmness score (e.g., floppy, wrinkled, etc.).

Color data 518 may be determined. For example, the computer 504 may determine a color of a produce item as item data. As illustrated, the three apples (e.g., training set data) may display varying shades of red that is translated to red/green/blue or RGB colors (e.g., 255/10/10, 255/100/10, 255/200/10, etc.). In some examples, brown dots or discolorations may be identified in color data 518 (e.g., location specific color data, color data by pixel, etc.), and, in some examples, the color data for a produce item can comprise multiple values for one or more of the different locations of the produce item (not shown).

Wrinkle/texture score data 520 may be determined. For example, the computer 504 may determine the number, frequency, position, or other characteristics of wrinkles corresponding with a produce item, including wrinkles at a particular location on the item (e.g., by the stem or root, etc.). In some examples, the computer 504 may determine the wrinkle score of the item on a scale (e.g., 0 is very smooth/hard and 10 is very wrinkled, etc.). The computer 504 may also determine the texture score of the item on a scale (e.g., 0 is very smooth/hard and 10 is very bumpy, etc.) along with or independently of the wrinkle score. In some examples, other surface characteristics may be included with the wrinkle/texture score data 520. For example, the appearance or texture of bruises, mold, spotting (e.g., brown spots on the produce item), ripping in the skin of the produce item, gradient wrinkle/texture changes across the produce item, or other characteristics may affect the ripeness over time. In some examples, a three-dimensional (3D) roughness score may be determined to identify the texture variety in already bumpy produce (e.g., avocadoes are generally bumpy, but the texture may change as they become riper, etc.).

In some examples, the wrinkle/texture score data 520 may be used to identify one or more unique produce types (e.g., Fuji apples with a wrinkle score of 8, etc.). As an example illustration, the texture for a banana (e.g., relatively smooth) may be different than a texture of an avocado (e.g., relatively bumpy), and the relative texture of each produce item can be identified in comparison with other known produce items (e.g., in the training data set). The wrinkle/texture score data 520 may identify expected differences in texture between the two produce types (e.g., to identify the origin of the produce item, to identify the type of produce item, etc.).

Subsurface scatter score 522 may be determined. For example, the computer 504 may determine the amount of light that penetrates the surface of the produce item, interacts with the material below the surface, and exits the surface to provide an additional source of light and/or item data. In some examples, the subsurface scatter score 522 may help measure the juiciness or moisture of the produce item, translucency of the produce item's skin, or other ripeness metrics. As illustrated, the subsurface scatter score 522 may be rated on a scale (e.g., 0 is very juicy and 10 is dry, or 0 is very translucent skin with a lot of light able to penetrate and/or exit through the surface of the produce item and 10 is very opaque with little light able to penetrate and/or exit through the surface of the produce item, etc.).

Date data 524 may be determined. For example, the computer 504 may determine the amount of time until the produce item is rotten (e.g., to count down). In some examples, the computer 504 may determine the date data of the item on a scale. For example, 0 may correspond with the date the item was picked at the farm and 10 may correspond with the date when the produce item has been at the facility for at least a month. The date data 524 may also be restricted by arrival at the facility (e.g., instead of or in addition to farm data). In another example, 0 corresponds with ten days or more until the produce item is rotten and 10 is zero days until the produce item is rotten, etc. In some examples, the date data may correspond with an increasing value (e.g., Jan. 1, 2014=received at facility, picked at farm, transported to location associated with the user, etc.) or rating (e.g., 0 days in storage at facility which corresponds with the date instead of a scale, 15 days in the storage facility, etc.).

Ripeness score 526 may be determined. The ripeness score may be determined based in part on the surface or subsurface characteristics, including the data identified in data store 502. For example, when one of the ripeness characteristics of the produce item and/or produce type of the produce item includes mold, the ripeness score of the produce item may be adjusted to include the existence of mold on the produce item (e.g., more advanced ripeness score, closer to rotten, etc.). In some examples, the computer 504 may determine the ripeness score of the item on a scale (e.g., 0 is raw and 10 is rotten, etc.).

The computer 504 may determine the ripeness score based in part on training data associated with a produce type. The method may include determining subsurface scattering data, infrared data, visible light data, and firmness data of a training item associated with the training data set. The computer 504 may analyze the subsurface scattering data, infrared data, visible light data, and firmness data of the training item and correlate the subsurface scattering data, infrared data, visible light data, and firmness data of the training item with a corresponding ripeness score. When the ripeness characteristics of the produce item is within a threshold of the subsurface scattering data, infrared data, visible light data, and firmness data of the training item, the ripeness score of the produce item may be determined. The ripeness score of the produce item may be the same as the corresponding ripeness score of the training item.

As a sample illustration, the computer 504 may access the data including the data identified in data store 502, where the subsurface scatter score is within a range of 5-7, the visible light data is plus/minus 5 of 255/10/10, and the firmness data is within a range of 5-6. The computer 504 may analyze the data and determine that the ripeness characteristics of the produce item associate the produce item within a threshold of a particular ripeness score (e.g., a ripeness score of 5). This may translate to a produce item that is about half-way between very raw and rotten. With other metrics and data (e.g., wrinkle score, etc.), the ripeness score may be higher or lower. Other measurements, ranges, or characteristics of the produce item may be analyzed with respect to a threshold without diverting from the scope of the disclosure.

In some examples, other determinations may be made based in part on the data. For example, a supplier and/or other user may provide an apple (or crate of apples, crate of peppers, etc.) to the computer 504 (e.g., at a fulfillment center or other facility). The computer 504 can identify the data associated with the received produce item(s) (e.g., image data 510, produce type data 512, origin data 514, firmness data 516, color data 518, wrinkle/texture score data 520, subsurface scatter score 522, date data 524, and ripeness score 526). In some examples, the data can help determine whether the facility should accept the produce items from the supplier (e.g., not accept the crate of the apples if they are too ripe (e.g., ripeness score of 8 or higher), not accept the container of berries if they have mold (e.g., based in part on image data and/or visual characteristics, etc.)). The facility may reject the produce items.

Figure 6:
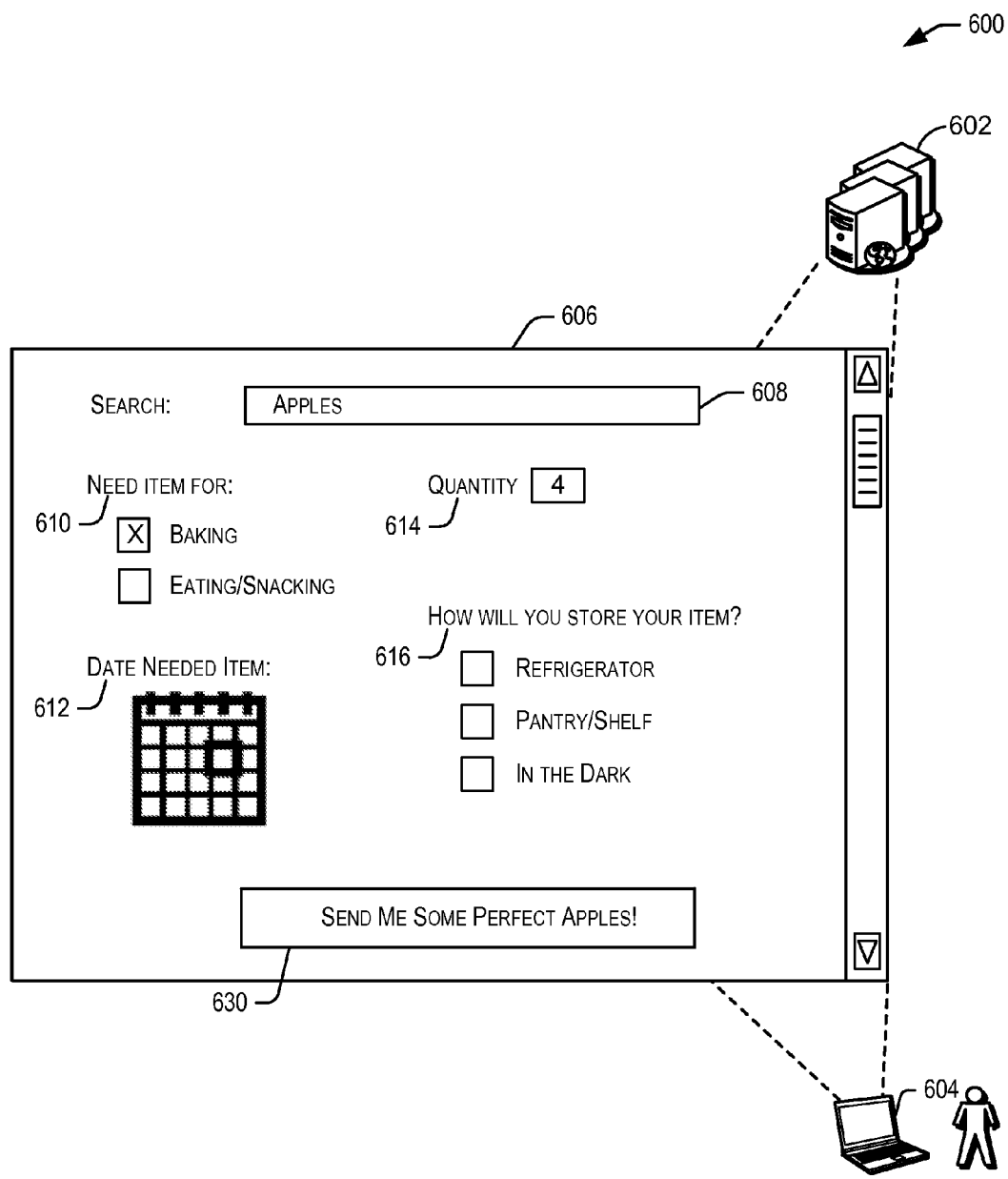
FIG. 6 illustrates an example of a communication from a user for requesting produce associated with a ripeness score described herein, according to at least one example.

FIG. 6 illustrates an example of a communication from a user for requesting produce associated with a ripeness score described herein, according to at least one example. In illustration 600, a computing device 602 interacts with a user computing device or user device 604. The computing device 602 may provide a network page 606 for the user to access using the user device 604. Examples of the computing device 602 and user device 604 are illustrated in FIG. 2 as one or more item analytics computers 210 and one or more user devices 204, respectively.

The network page 606 can include a search tool 608. The search tool 608 can provide a text box, drop-down list, or other tool known in the art to accept an identification of a type of produce item from a user. For example, the user may type "apples" into search tool 608 or select "apples" from a list of types of produce items (e.g., "Would you like to order bananas, apples, or peppers today?"). The user may respond "yes, I would like peppers" or selects "apples" from a list of options associated with the search tool 608.

The network page 606 can include a purpose 610 for the produce item. For example, the purpose may include "baking" or "eating/snacking" as potential purposes. In some examples, as illustrated in FIG. 1, the network page may provide images of the item for the user to select for the purpose (e.g., without defining "baking" or "eating"). For example, the user may select an image of a very ripe banana as a desired purpose, because the purpose of ordering the bananas is for baking.

The network page 606 can include a calendar 612 to accept date data. For example, the user may specify Saturday morning on the calendar 612, corresponding with the time that the user plans to bake banana bread (e.g., using the very ripe bananas). The user may access the calendar 612 to identify Saturday morning as the desired date to receive the produce item. In some example, the user may identify that they would like to receive the item immediately, but plan to use the produce item on a different date. The calendar 612 may accept more than one date as date data (e.g., the desired ship date, the desired use date, etc.).

The network page 606 can include a tool to specify quantity 614. For example, the user may type a desired quantity of produce item (e.g., 4 or 5). In some examples, the network page may suggest a quantity (e.g., the user is planning to bake banana bread, so the network page suggests three bananas).

The network page 606 can include one or more questions associated with environmental factors. The network page 606 can ask the user to provide additional information associated with environmental factors that may affect the ripeness of the item once the produce item has been delivered to the user. For example, the questions can include whether the user plans to store the item in a refrigerator (e.g., with associated levels of temperature, light, humidity, etc.), pantry or shelf (e.g., with associated levels of moisture, light, etc.), in the dark, etc.

The network page 606 can include a tool 630 to submit the request. For example, the user may provide information (e.g., via the search tool 608, purpose 610, etc.) and activate the tool 630 through the network page (e.g., by clicking, tapping, hovering, selecting, etc.). The activation of the tool 630 may transmit a communication to the computing device 602 that initiates a process to identify one or more produce items that correspond with the user's request. As illustrated, the user may request four apples for baking by next week. The computing device 602 may receive the communication and initiate a process to identify the four apples that will correspond with the ripeness score (e.g., very ripe) by the date identified by the user.

Figure 7:
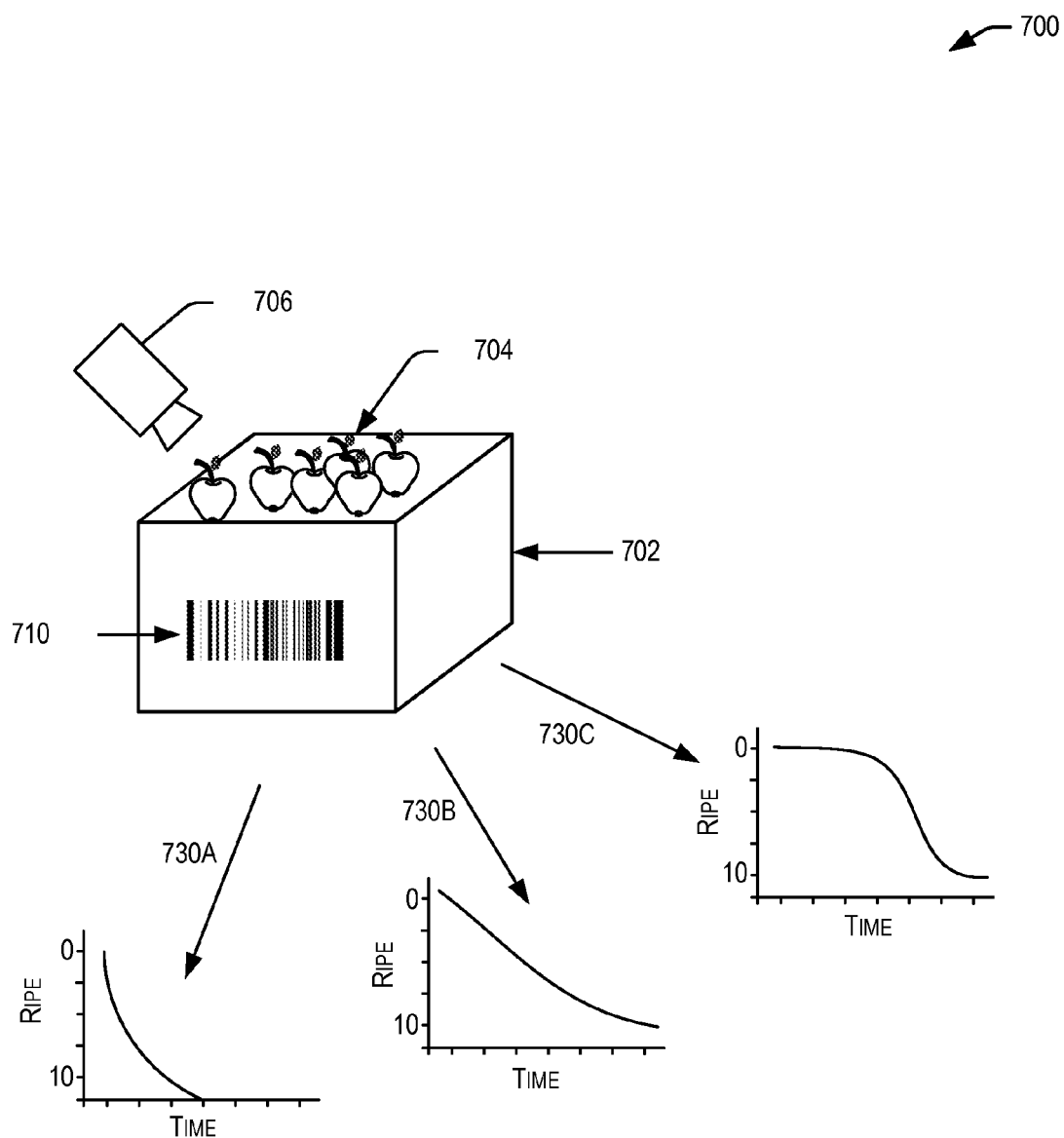
FIG. 7 illustrates some examples of accessing ripeness characteristics, including ripeness regressions described herein, according to at least one example.

FIG. 7 illustrates some examples of accessing ripeness characteristics, including ripeness regressions described herein, according to at least one example. In illustration 700, a crate 702 may include one or more produce items 704. Visual or infrared characteristics of the produce items may be captured by one or more cameras 706, sensors, or other apparatuses associated with the computing device and illustrated throughout the disclosure. In some examples, the origin of the produce items may be identified using a barcode 710 associated with the crate 702, shipping information, visual comparisons with previously identified produce items from a similar location, and the like.

One or more ripeness regressions 730A, 730B, 730C may be identified (hereinafter "ripeness regression 730"). For example, with a training data set, one or more produce items 704 may be analyzed substantially on arrival (e.g., at a warehouse, facility, fulfillment center, etc.). The left-most portion of the ripeness regression 730 may identify the ripeness score of the produce item on arrival (e.g., very raw is 0, very ripe or rotten is 10, etc.). As illustrated, the ripeness of the produce items on arrival is relatively raw (e.g., ripeness score of 0). As time passes, the ripeness of the produce item may become more ripe to rotten (e.g., ripeness score of 10).

The ripeness of the produce items may be measured with respect to time. The measurements may include item data (e.g., firmness, wrinkles, subsurface scattering, etc.) calculated at time increments. For example, the firmness of a pepper may be measured daily. When the pepper compresses with one-pound of pressure on day one, the ripeness score of the pepper on that date may be 4, but when the pepper compresses with half-pound of pressure on day five, the ripeness score of the pepper on that date may be 8. Similarly, images of the produce item may be measured at time increments as well. At day four, the subsurface scattering image of an orange shows juiciness relating to a ripeness score of 2. At day seven, the subsurface scattering image of the same orange shows juiciness relating to a ripeness score of 6.

The ripeness of the produce items may be measured with respect to environmental factors. For example, the ripeness regression may be based in part on a ripeness of the produce item when the produce item arrives at a location associated with the user (e.g., the item travels through the hot desert and would sit on a porch for four hours until the user arrives home from work, etc.).

The ripeness regression may vary based in part on item data. For example, the produce type may be determined as organic. The ripeness regression may be altered based in part on the identification. In some examples, a different ripeness regression may correspond with the produce item, such that the ripeness regression associated with organic produce is accessed instead of the ripeness regression associated with another origin of the produce item. In some examples, ripeness regressions are generated that correspond with each scenario (e.g., a first ripeness regression based on origin and organic produce, a second ripeness regression based on origin and non-organic produce, etc.).

In some examples, the ripeness regression may correspond with the time frame that the produce item is stored with the facility. For example, the ripeness of a produce item may be maintained for a longer time frame by storing the produce item with the one or more item analytics computers 210, one or more item data computers 260, and/or facility with optimized storing conditions.

As illustrated, ripeness regression 730A provides a ripeness regression for the apples with a steep and immediate decline over a short period of time. This regression may be based in part on various factors, including origin, item data, environmental factors, and the like. The ripeness regression 730B provides a relatively steady regression over time and the ripeness regression 730C illustrates a substantially raw produce item at delivery, with a steep increase in ripeness halfway through the observed ripeness of the produce item (e.g., after a certain time period or interaction with an environmental factor).

The ripeness regression may vary by produce type. For example, bananas could progress from ripeness score of 0 to 8 in one week, whereas an apple might progress from a ripeness score of 0 to 8 in two weeks.

Figure 8:
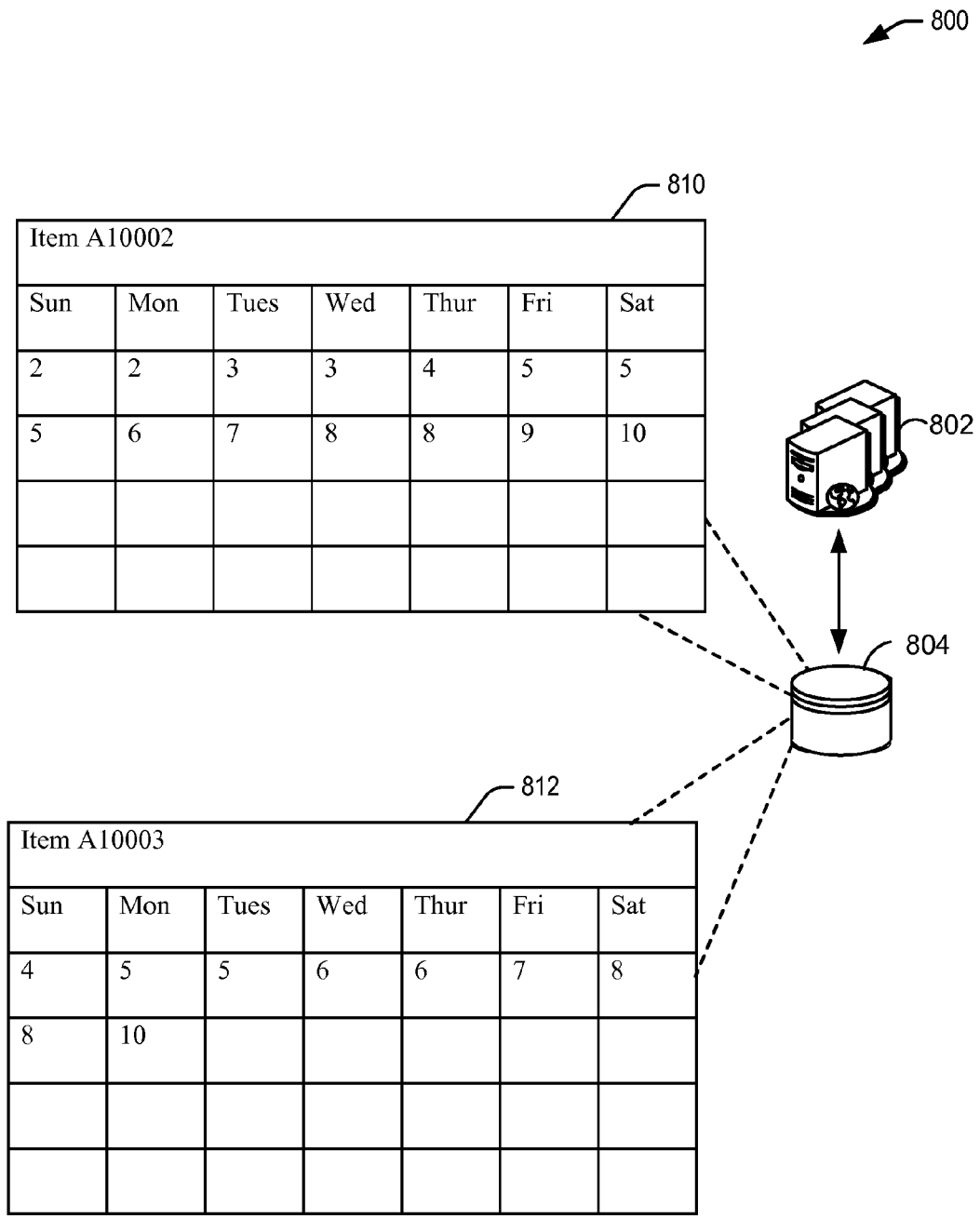
FIG. 8 illustrates some examples of ripeness regressions associated with a time frame described herein, according to at least one example.

FIG. 8 illustrates some examples of ripeness regressions associated with a time frame described herein, according to at least one example. In illustration 800, a computing device 802 interacts with a data store 804. Examples of the computing device 802 and data store 804 are illustrated in FIG. 2 as one or more item analytics computers 210 and data store 234, respectively.

In some examples, the ripeness regression(s) of produce items may correspond with a calendar and/or time frame. As illustrated, the visual or infrared characteristics of the produce item may be received at the computing device 802 and/or data store 804. The computing device 802 may access ripeness characteristics of a produce type of the produce item in order to determine the ripeness score of the produce item. The ripeness score may be based in part on the comparison of the visual or infrared characteristics associated with the produce item and the ripeness regression of the produce type.

The ripeness score(s) of the produce item may be determined. For example, as shown in time frame 810, the produce item starts with a ripeness score of 2 on Sunday and maintains the ripeness score through Monday. On Tuesday and Wednesday, the produce item is associated with ripeness score of 3. On Thursday, the ripeness of produce item may correspond with a ripeness score of 4. Friday, Saturday, and Sunday, the ripeness score may correspond with 5. The ripeness score may quickly drop from 6 to 9, and become rotten by Saturday with a ripeness score of 10. As another illustration, time frame 820 may correspond with similar ripeness scores, but may achieve the ripeness scores on a different ripeness regression (e.g., arrival at a facility with a ripeness score of 4 and rotten by the following Monday).

When the ripeness regressions are determined, they may be applied to determine the ripeness scores of produce items. For example, the computing device 802 may receive a new produce item associated with time frame 810 (e.g., based in part on visual characteristics or other item data, environmental factors, etc.). The ripeness score on arrival may be 4. The corresponding ripeness regression of the new produce item may be inferred by the time frame 810 in order to identify that the produce item may become rotten in about nine days (e.g., which may or may not include transit time to the location of the user).

Figure 9:
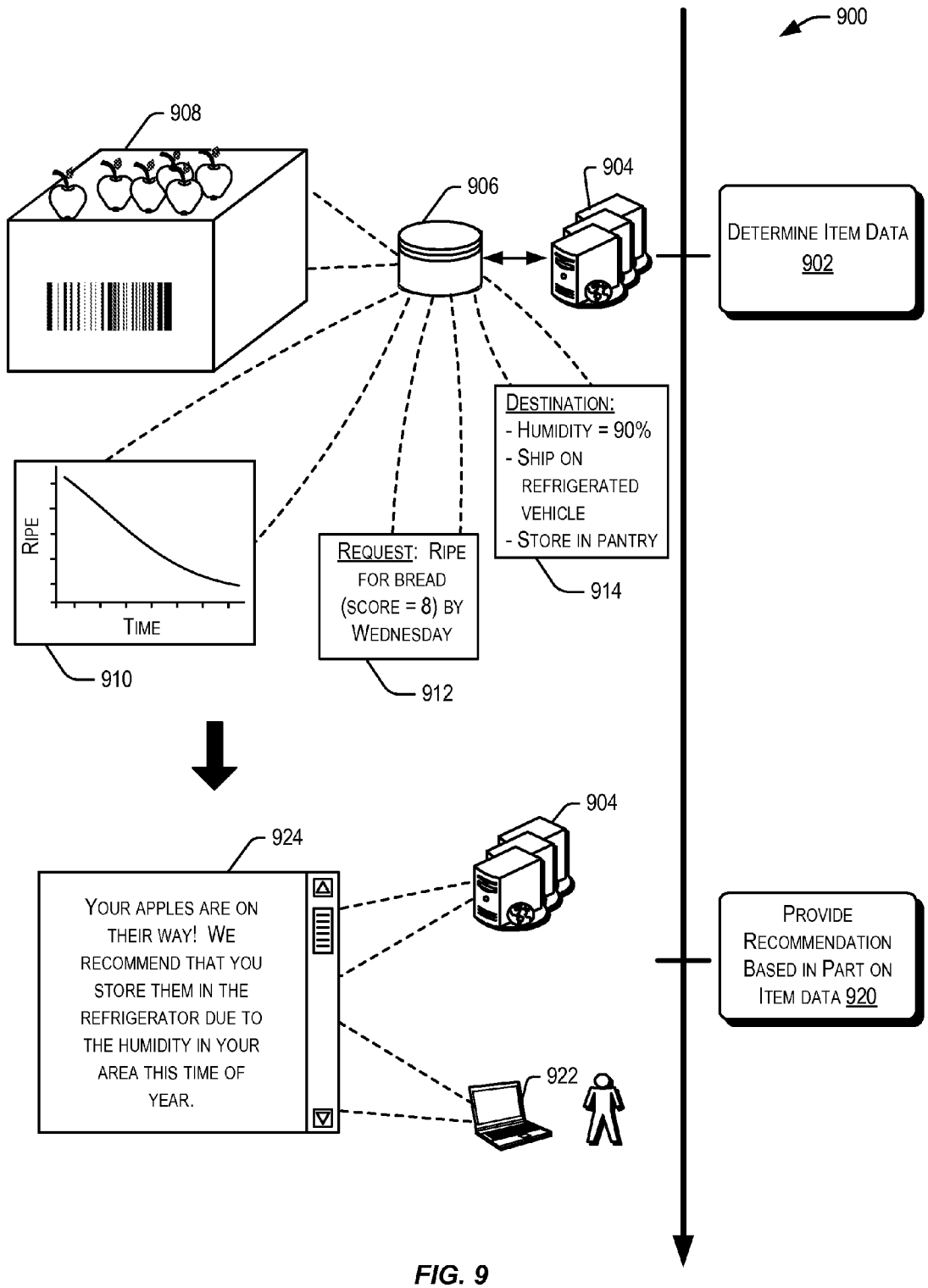
FIG. 9 illustrates an illustrative flow for predicting and detecting produce quality described herein, according to at least one example.

FIG. 9 illustrates an illustrative flow for predicting and detecting produce quality described herein, according to at least one example. The process 900 can begin with determining item data at 902. For example, a computing device 904 can interact with a data store 906 to access item data and/or interact with one or more items to determine the item data. Item data is identified throughout the specification, including origin data 908, ripeness regression 910, ripeness score 912, or environmental factors 914, as illustrated in FIGS. 1-8. Other data may be accessed without diverting from the scope of the disclosure.

In some examples, data may correspond with a user (e.g., user profile, etc.). For example, the computing device 904 can determine a profile of the user that includes a history of produce items requested and at least one desired ripeness score requested by the user (e.g., every other Thursday, the user requests bananas with a ripeness score of 7). The computing device 904 can determine a future need for the produce item based in part on the history of produce items requested (e.g., the prediction can include a request from the user for bananas next Thursday associated with the ripeness score of 7). The computing device 904 may provide a communication associated with the future need for the produce item that matches the at least one desired ripeness score requested by the user (e.g., "Would you like to order bananas that look like this next Thursday?" in a communication with a sample image of a banana at a ripeness score of 7).

The process 900 may also provide a recommendation based in part on the item data at 920. For example, the computing device 904 can provide a communication to the user with a recommendation of how to store the produce and/or achieve the desired ripeness score in the desired time frame. In some examples, the communication to the user includes an instruction of how to store the corresponding item to achieve the ripeness score by the time frame. As illustrated, the recommendation includes "Your apples are on their way! We recommend that you store them in a refrigerator due to the humidity in your area at this time of year."

The user may provide feedback as well. For example, after the user receives the item corresponding with the desired ripeness score, the user may communicate with the computing device 904 regarding the received ripeness of the produce item(s). This may include images of the produce item at arrival, environmental factors (e.g., the amount of sunlight around the produce item for storage, etc.), or other feedback. Based in part on the feedback, a received ripeness score may be determined for the produce item (e.g., predicted ripeness score of 5, received ripeness score of 8, etc.). In some examples, the feedback may be used to update the ripeness regression(s) as well. For example, based in part on the time frame that the corresponding item was received by the user, the ripeness regression may be updated to correspond with the environmental factors and/or feedback provided by the user.

Illustrative methods and systems for predicting and detecting produce quality are described above. Some or all of these systems and methods may, but need not, be implemented at least partially by architectures such as those shown at least in FIGS. 1-9 above.

Figure 10:
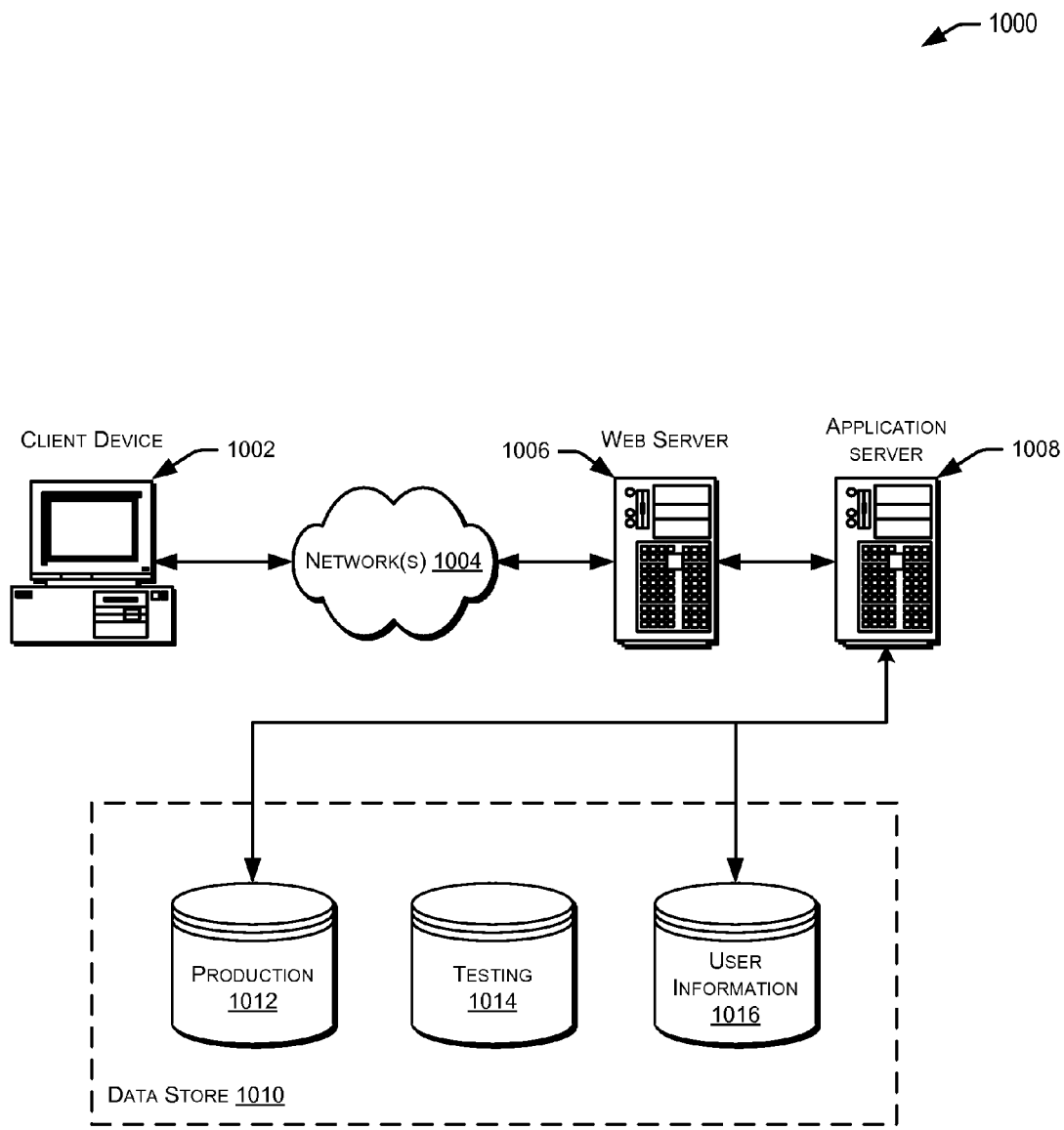
FIG. 10 illustrates an environment in which various embodiments of predicting and detecting produce quality can be implemented, according to at least one example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media collectively storing computer-executable instructions that, when executed by one or more computer systems, configure the one or more computer systems to collectively perform operations comprising:
   accessing information regarding a produce item, including an origin of the produce item, the origin of the produce item identified by:
   accessing origin information, the origin information including data representing one or more visual or infrared characteristics associated with other produce items of a same produce type from different origins;
   comparing the data representing visual or infrared characteristics associated with the produce item with the data representing one or more visual or infrared characteristics associated with the other produce items; and
   determining the origin of the produce item based in part on the comparison;
   accessing a training data set associated with the origin of the produce item, the training data set comprising ripeness characteristics of a produce type of the produce item, the ripeness characteristics representing a ripeness regression of the produce type over a time frame and in response to one or more environmental factors;
   receiving data representing visual or infrared characteristics associated with the produce item from one or more imaging devices as the produce item moves on a conveyor belt;

determining a ripeness score of the produce item based at least in part on a second comparison of the data representing visual or infrared characteristics and the training data set;
utilizing a communication from a user for a desired produce item associated with a desired ripeness score; and instructing that a produce item having the desired ripeness score be provided to the user as the desired produce item.

2. The one or more non-transitory computer-readable storage media of claim 1, wherein receiving data representing visual or infrared characteristics associated with the produce item includes operating the one or more imaging devices to capture a plurality of images of the produce item, wherein the plurality of images includes at least a first angle and a second angle of the produce item.

3. The one or more non-transitory computer-readable storage media of claim 1, wherein the training data set includes one or more images of other produce items of a same produce type or variety as the produce item.

4. The one or more non-transitory computer-readable storage media of claim 1, wherein the origin of the produce item is identified by a barcode, and the operations further comprising:
scanning the barcode to access information regarding the origin of the produce item.

5. A computer-implemented method, comprising:
receiving, at a computing device comprising a processor, data representing visual or infrared characteristics associated with a produce item;
accessing ripeness characteristics of a produce type of the produce item, the ripeness characteristics representing a ripeness regression of the produce type in response to at least one of a time frame or one or more environmental factors, the ripeness characteristics of the produce type of the produce item including a presence of mold;
determining whether the ripeness characteristics of the produce item includes the mold;
determining a ripeness score of the produce item based at least in part on a comparison of the data representing visual or infrared characteristics associated with the produce item and the ripeness regression of the produce type, and the existence or non-existence of the mold on the produce item; and
utilizing a request for a desired produce item, wherein the request comprises a desired ripeness score for the desired produce item.

6. The computer-implemented method of claim 5, further comprising:
determining that the produce type of the produce item is organic; and
accessing the ripeness regression of the produce type associated with organic produce.

7. The computer-implemented method of claim 5, wherein the one or more environmental factors includes a temperature or humidity of a facility that receives the produce item and determines the ripeness score of the produce item.

8. The computer-implemented method of claim 5, wherein the one or more environmental factors includes a temperature or humidity of a location of a user that receives the produce item from a facility that determined the ripeness score of the produce item.

9. The computer-implemented method of claim 5, wherein the ripeness score is based in part on the data representing visual characteristics, infrared characteristics, texture, and subsurface scattering of the produce item.

10. A computer-implemented method, comprising:
receiving, at a computing device comprising a processor, data representing visual or infrared characteristics associated with a produce item;
accessing ripeness characteristics of a produce type of the produce item, the ripeness characteristics representing a ripeness regression of the produce type in response to at least one of a time frame or one or more environmental factors;
determining a ripeness score of the produce item based at least in part on a comparison of the data representing visual or infrared characteristics associated with the produce item and the ripeness regression of the produce type;
utilizing a request for a desired produce item, wherein the request comprises a desired ripeness score for the desired produce item, wherein the desired ripeness score for the desired produce item is indicated by at least one of an image of the produce item, a purpose of the produce item, a desired date of use for the produce item, or one or more environmental factors associated with a location of a user;
identifying a second produce item predicted to have the desired ripeness score on the desired date of use based at least in part on the ripeness regression; and
instructing that the identified second produce item predicted to have the desired ripeness score on the desired date of use be provided in response to the request.

11. A computer-implemented method comprising:
determining subsurface scattering data, infrared data, visible light data, and firmness data of a training item associated with a training data set;
analyzing the subsurface scattering data, infrared data, visible light data, and firmness data of the training item;
correlating the subsurface scattering data, infrared data, visible light data, and firmness data of the training item with a corresponding ripeness score, wherein the corresponding ripeness score is determined based in part on the training data set associated with a produce type;
receiving, at a computing device comprising a processor, data representing visual or infrared characteristics associated with a produce item;
accessing ripeness characteristics of the produce type of the produce item, the ripeness characteristics representing a ripeness regression of the produce type in response to at least one of a time frame or one or more environmental factors;
in response to the ripeness characteristics of the produce item being within a threshold of the subsurface scattering data, infrared data, visible light data, and firmness data of the training item, determining a ripeness score of the produce item to be the same as the corresponding ripeness score of the training item based at least in part on a comparison of the data representing visual or infrared characteristics associated with the produce item and the ripeness regression of the produce type; and
utilizing a request for a desired produce item, wherein the request comprises a desired ripeness score for the desired produce item.

12. A computing device comprising:
a memory configured to store computer-executable instructions; and a processor in communication with the memory configured to execute the computer-executable instructions to at least:

provide, by the computing device, a graphical user interface through a network page, the graphical user interface including at least a first image of a produce type at a first ripeness score and a second image of the produce type at a second ripeness score displayed by the network page, the first ripeness score and the second ripeness score determined using visual or infrared characteristics associated with the corresponding produce item from one or more imaging devices;

receive, by the computing device, a request from a user through the network page to receive a produce item of the produce type associated with the first ripeness score at a particular time;

determine a corresponding produce item at a facility associated with the first ripeness score, the corresponding produce item of the same produce type as the requested produce item and predicted to achieve the first ripeness score at the particular time based in part on a ripeness regression of the produce type;

instruct the facility to provide the corresponding produce item to the user based in part on the ripeness regression by the particular time;

receive feedback after the corresponding produce item is provided to the user; and update the ripeness regression of the produce type based in part on the particular time that the corresponding produce item was received by the user.

13. The computing device of claim 12, wherein the instructions further comprise:

receive feedback after the corresponding produce item is provided to the user; and based in part on the feedback, determine a received ripeness score of the corresponding produce item.

14. The computing device of claim 12, wherein the instructions further comprise:

provide a communication to the user associated with the corresponding produce item, the communication including an instruction of how to store the corresponding produce item to achieve the first ripeness score at the particular time.

15. The computing device of claim 12, wherein the corresponding produce item is provided to the user to achieve the first ripeness score at the particular time when the corresponding produce item arrives at a location associated with the user.

16. A computing device comprising:

a memory configured to store computer-executable instructions; and a processor in communication with the memory configured to execute the computer-executable instructions to at least:

provide, by the computing device, a graphical user interface through a network page, the graphical user interface including at least a first image of a produce type at a first ripeness score and a second image of the produce type at a second ripeness score displayed by the network page, the first ripeness score and the second ripeness score determined using visual or infrared characteristics associated with the corresponding produce item from one or more imaging devices;

receive, by the computing device, a request from a user through the network page to receive a produce item of the produce type associated with the first ripeness score at a particular time;

determine a corresponding produce item at a facility associated with the first ripeness score, the corresponding produce item of the same produce type as the requested produce item and predicted to achieve the first ripeness score at the particular time based in part on a ripeness regression of the produce type;

instruct the facility to provide the corresponding produce item to the user based in part on the ripeness regression by the particular time;

determine a profile of the user, the profile including a history of a past produce item requested and at least one desired ripeness score associated with the past produce item requested by the user;

determine a future need for the past produce item based in part on the history of the past produce item requested; and provide a communication associated with the future need for the past produce item that matches the at least one desired ripeness score associated with the past produce item requested by the user.

* * * * *